March 18, 1930. T. O'DONNELL 1,751,168
SIGNAL BOX
Filed July 19, 1928 3 Sheets-Sheet 1
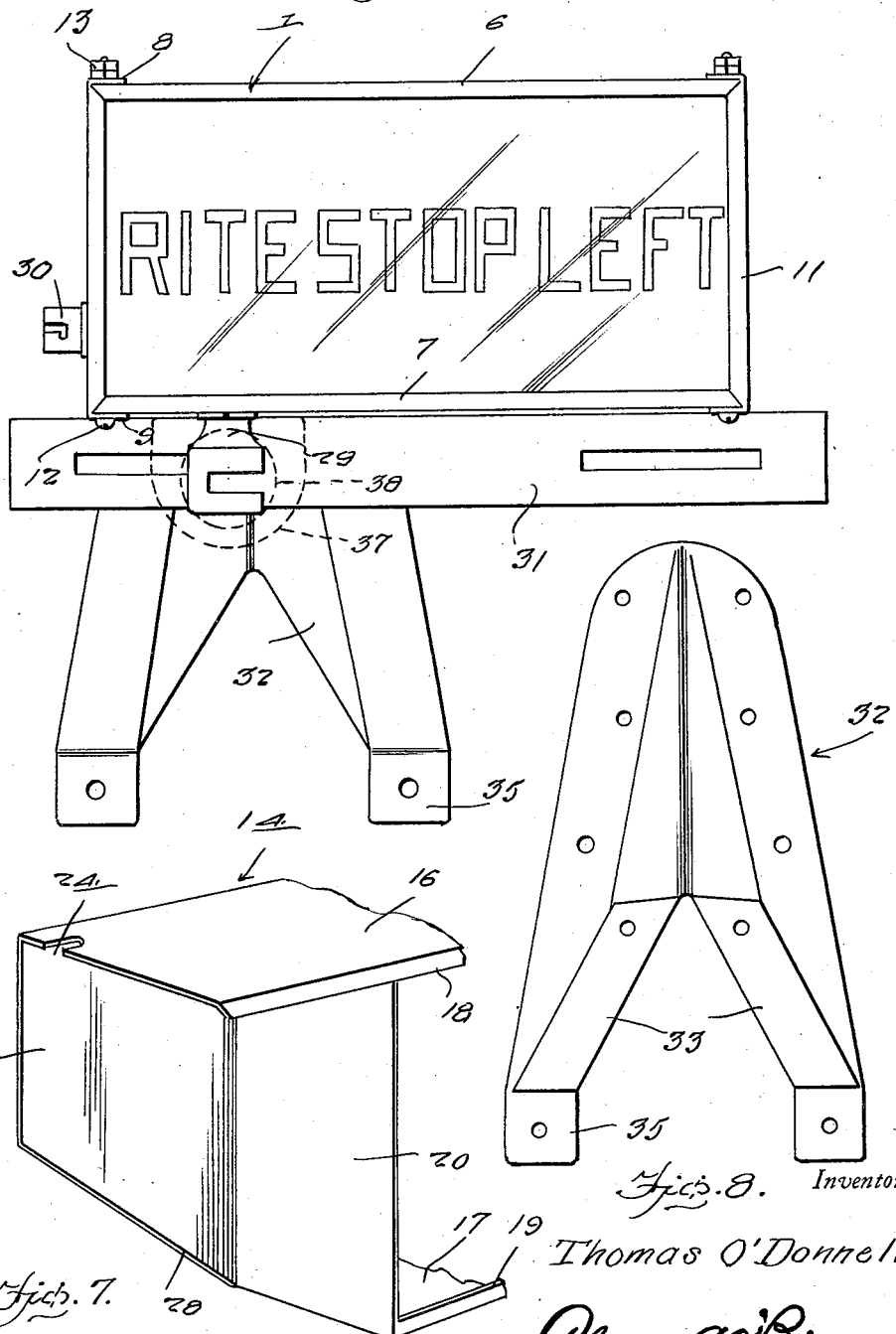
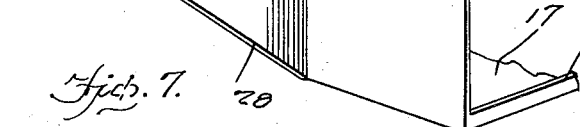

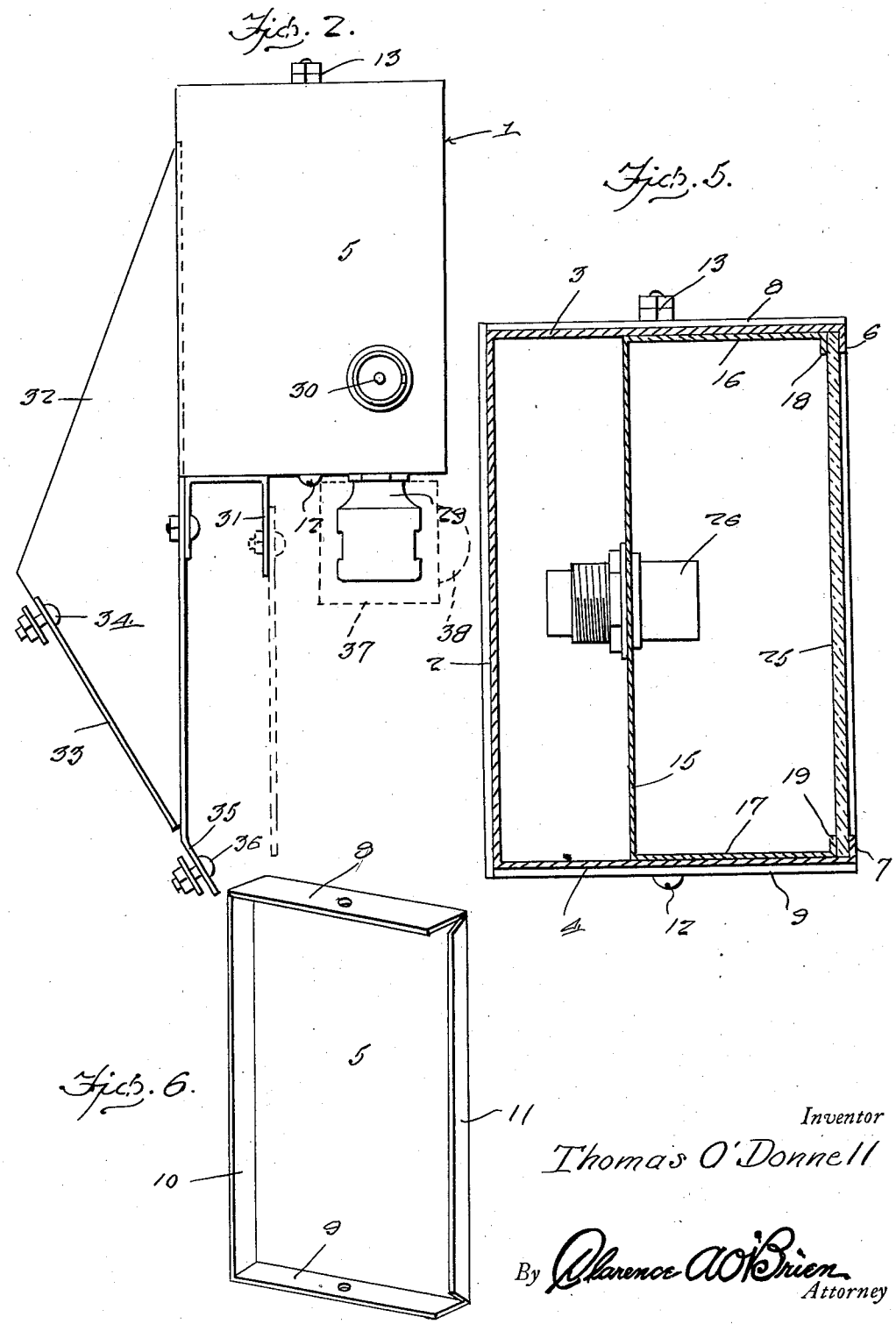

March 18, 1930.  T. O'DONNELL  1,751,168
SIGNAL BOX
Filed July 19, 1928  3 Sheets-Sheet 3
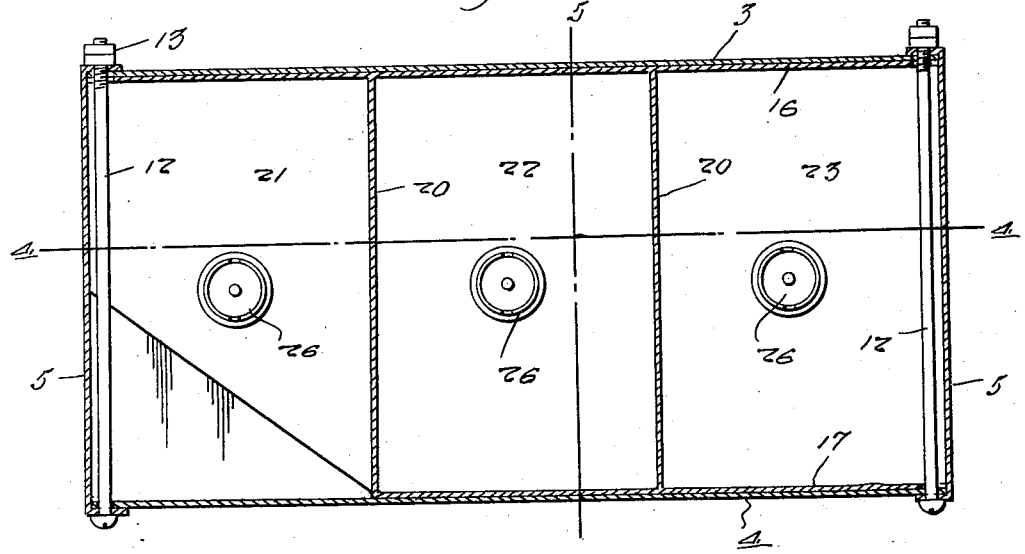
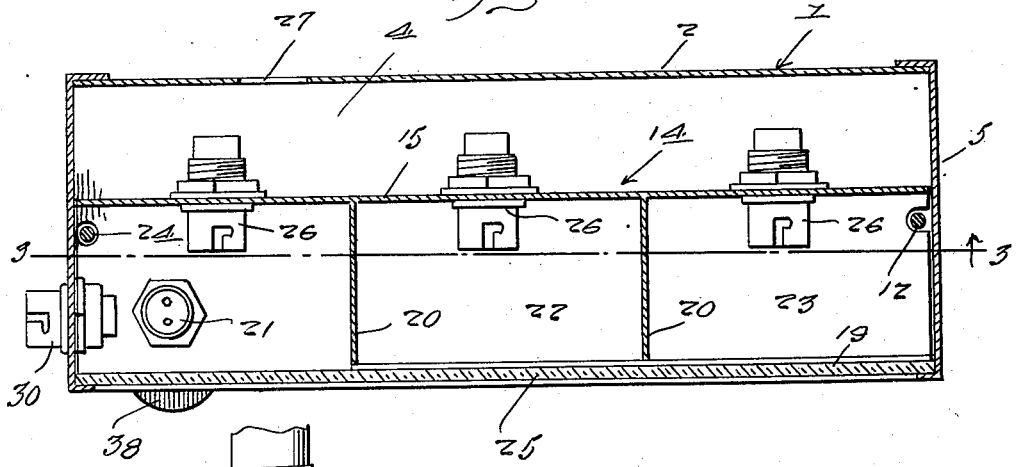
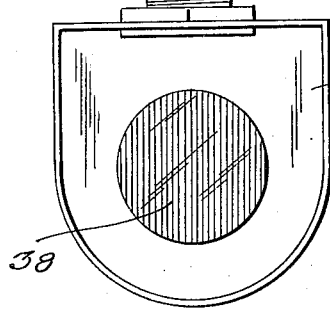
Inventor
Thomas O'Donnell
By Clarence A. O'Brien
Attorney Patented Mar. 18, 1930

1,751,168

UNITED STATES PATENT OFFICE

THOMAS O'DONNELL, OF IRONWOOD, MICHIGAN

SIGNAL BOX

Application filed July 19, 1928. Serial No. 293,944.

The present invention relates to improvements in vehicle direction indicators and has reference more particularly to a signal box that is to be mounted preferably on one of the rear fenders of an automobile.

One of the important objects of the present invention is to provide a signal box which includes a bracket for supporting a license plate, a removable unit being arranged within the signal box and being so constructed as to provide independent compartments, each compartment representing a predetermined signal, a lamp being arranged in each compartment for illuminating the same, an additional lamp being provided for illuminating the license tag.

A further object is to provide a signal box of the above mentioned character wherein the parts can be readily and easily assembled or disassembled, the same being further simple in construction, inexpensive, strong and durable, and further well adapted to the purpose for which it is designed.

Other objects of the invention will become apparent as the nature of the invention proceeds and when taken in connection with the accompanying drawings.

Still a further object is to provide a signal box which includes removable end walls, the back wall of the removable unit being spaced from the back wall of the box or casing, whereby to entirely enclose the lamp socket for the independent compartments associated with the removable unit in the casing.

In the drawings, wherein for the purpose of illustration is shown the preferred embodiment of my invention, and in which like numerals designate like parts throughout the several views:

Figure 1 is a front elevation of the signal box and attaching bracket therefor embodying my invention.

Figure 2 is an end elevation.

Figure 3 is a vertical sectional view through the signal box taken approximately on the line 3—3 of Figure 4, looking in the direction of the arrows.

Figure 4 is a sectional view, taken approximately on the line 4—4 of Figure 3, looking in the direction of the arrows.

Figure 5 is a sectional view, taken approximately on the line 5—5 of Figure 3, on an enlarged scale.

Figure 6 is a detail perspective view of one of the removable end sections for the signal box or casing.

Figure 7 is a fragmentary detail perspective view of one end of the removable unit.

Figure 8 is a rear elevation of the attaching bracket; and

Figure 9 is a detail rear elevation of a cover for the tail lamp.

In the drawings, wherein for the purpose of illustration is shown the preferred embodiment of my invention, the numeral 1 designates generally the rectangularly shaped casing or signal box that is constructed of metal, the same comprising the rear wall 2, the top and bottom sides 3 and 4 respectively and the removable end wall 5, the front side of the casing being open. The forward edges of the top and bottom sides are formed with the laterally disposed flanges 6 and 7 respectively, these flanges extending for the full length of the casing and the ends of the flanges are cut away at an angle as more clearly disclosed in Figure 1.

The removable end walls 5 are formed at each end with the inwardly directed flanges 8 and 9 respectively for engagement over the outer faces of the top and bottom sides of the casing and a flange 10 is formed on the rear side edge for each wall for engagement with the outer face of the rear wall 2 of the casing.

The flange 11 formed on the forward side edge of each side wall has its ends cut away for cooperation with the flanges 6 and 7 respectively, as clearly indicated in Figure 1. These end walls are detachably secured in position on the casing, by means of the elongated bolts 12 that extend through registering openings formed in the top and bottom sides of the casing as well as in communicating openings formed in the upper and lower flanges 8 and 9.

Suitable nuts 13 are threaded on the threaded ends of these bolts as suggested more clearly in Figure 3.

Also forming an important part of the present invention is the removable unit, designated generally by the unit 14 that is adapted for disposition within the casing or box 1. This unit includes a vertical rear wall 15 and the top and bottom sides 16 and 17 respectively, the forward side and the ends of this unit being open. A downwardly directed flange 18 is formed on the forward edge of the top side 16 of the unit 14 and an upwardly directed flange 19 is formed on the forward edge of the bottom 17 of the unit, and this arrangement is more clearly shown in Figures 5 and 7 of the drawings.

A pair of vertically arranged spaced partitions 20 are associated with the unit 14, whereby to divide said unit into three independent compartments, designated by the numerals 21, 22 and 23 respectively, as clearly shown in Figures 3 and 4 of the drawings.

The unit 14 is of a length slightly less than the length of the casing 1 and is of such height as to fit snugly in the casing 1. Also the unit is of such width as to have its rear wall 15 spaced from the rear wall 2 of the casing 1, when the unit is properly positioned in the casing, and the top and bottom sides of the unit are notched as at 24, to accommodate the bolts 12 and secure the removable end walls on the casing.

The flanges 18 and 19 are spaced with respect to the adjacent flanges 6 and 7, whereby to provide a means for receiving the glass panel 25 that covers the open front side of the casing and the open sides of the respective compartments of the unit 14, and painted or otherwise arranged on this glass panel are the words "Rite," "Stop" and "Left," as shown in Figure 1. The word "Rite" is arranged in front of the compartment 21; the word "Left" is arranged in front of the compartment 23; while the word "Stop" is arranged in front of the intermediate or central compartment 22.

A lamp socket 26 of any conventional construction is secured in the rear wall of each compartment for supporting an electric lamp (not shown) in each of the compartments 21, 22, and 23 respectively, for illuminating the respective signals and the wires that supply the current to the several lamps are connected to the rear ends of these lamp sockets and an opening 27 is formed in the rear wall of the casing 1 to accommodate the wires, and the wires are connected to any suitable source of supply (not shown) in the manner well known in the art. It is to be also understood that appropriate switches are provided for disposition preferably on the instrument board of the vehicle, whereby the operator can readily actuate any one of the switches to give the proper signal when making a turn either to the right or left, or when the vehicle is to be brought to a stop, and if desired, the stop signal may be operated, simultaneously with the operation of the brake pedal, in the manner also well known in the art, and as the switch mechanism forms no part of the present invention, a disclosure or description of the same is believed unnecessary.

As clearly shown in Figures 3 and 7, the end compartment 21 has its rear wall cut away as at 28, and there is no bottom associated with the unit 14 for this particular compartment, this structure being preferable for the purpose of permitting the wires to the tail lamp and socket 29 that extends from the bottom side of the casing 1 to be connected thereto. A trouble lamp attaching socket 30 is disposed through one of the end walls 5 and the wires for this socket also pass through the compartment 21.

Attached to the bottom of the casing 1 at the rear edge portion thereof, and extending longitudinally of the casing is the license plate supporting member 31 and the lamp that is placed in the socket 29 will illuminate the license tag as is obvious from the structure shown in Figure 2.

The attaching bracket for the signal is shown generally at 32, in Figure 8.

This bracket is secured to the rear side of the casing by any appropriate fastening means and is formed at its lower end with the securing flanges 33 that are adapted to be secured to one of the rear fenders of the automobile, by the securing bolt 34. In addition, the sides of the bracket terminate at their lower ends in the attaching ears 35, that also are secured to the rear fender by the securing bolts 36.

A cover unit shown at 37 in Figure 9 is provided for the tail lamp. The rear side of the cover is open to permit the license tag to be properly illuminated. A red colored bulls eye 38 is set in an opening provided therefor in the front side of the cover.

It will thus be seen from the foregoing description that I have provided a vehicle direction signal box that can be constructed at a very low cost and the parts can furthermore be readily and easily assembled and disassembled. Furthermore a structure of the above mentioned character will not detract from the appearance of the automobile upon which the signal is mounted.

While I have shown the preferred embodiment of my invention, it is to be understood that minor changes in the size, shape, and arrangement of parts may be resorted to without departing from the spirit of the invention or the scope of the appended claims.

Having thus described my invention, what I claim as new is:

1. In a vehicle direction signal, a casing including top and bottom sides, a connecting rear wall, removable end walls, means for securing the removable end walls on the casing, the forward edges of the top and bottom sides being formed with inwardly directed flanges, a unit removably arranged in the casing and including a rear wall, top and bottom sides, inwardly directed flanges formed on the forward edges of the top and bottom sides and being spaced with respect to the respective aforementioned flanges, vertical partitions dividing the unit into independent compartments that are open at their front sides, a lamp socket for each compartment, a glass panel covering the open front side of the casing, and the open front side of the respective compartments, said glass panels being maintained in position between the aforementioned flanges, the glass panel being provided with signalling indicia thereon in front of the respective compartments, and an attaching bracket for the casing.

2. In a vehicle direction indicator, a casing open at its front side, a unit arranged within the front portion of the casing and including a rear wall, top and bottom sides, vertical partitions dividing the unit into independent compartments that are open at their front sides, the bottom and adjacent portion of the rear wall of one compartment being open, a lamp socket extending through the rear side of each compartment, a glass panel covering the open front side of the casing and the open front sides of the respective compartments, said glass panel being provided with indicating indicia for each of the compartments, a tail light receiving socket extending downwardly from the bottom of the casing directly below the compartment whose bottom is open, an attaching bracket for the casing, and a license plate attaching bracket secured on said casing attaching bracket for disposition across the bottom of the casing.

In testimony whereof I affix my signature.

THOMAS O'DONNELL.